United States Patent [19]
Kotanigawa et al.

[11] 3,923,907
[45] Dec. 2, 1975

[54] PROCESS FOR THE PREPARATION OF METHYLATED PHENOLS

[75] Inventors: Takeshi Kotanigawa; Mitsuyoshi Yamamoto; Katsuyoshi Shimokawa, all of Sapporo, Japan

[73] Assignee: Director-General, Agency of Industrial Science and Technology, Japan

[22] Filed: July 19, 1972

[21] Appl. No.: 273,049

[30] Foreign Application Priority Data
July 21, 1971  Japan.................................. 46-54429

[52] U.S. Cl............... 260/621 R; 252/470; 252/471
[51] Int. Cl.² .......................................... C07C 37/16
[58] Field of Search..... 260/621 R, 624 C; 252/470, 252/471

[56] References Cited
UNITED STATES PATENTS

| | | | |
|---|---|---|---|
| 2,448,942 | 9/1948 | Winkler et al. | 260/624 C X |
| 3,526,675 | 9/1970 | Croce et al. | 252/471 X |
| 3,567,793 | 3/1971 | Colling et al. | 252/471 X |
| 3,666,684 | 5/1972 | Koslosky | 252/471 X |
| 3,716,589 | 2/1973 | Kotanigawa et al. | 260/621 R |

OTHER PUBLICATIONS
Kotanigawa et al., "Bull. Soc. Chem. Japan," Vol. 44, No. 7, pp. 1961–1964, (1971).

*Primary Examiner*—Norman P. Morgenstern
*Attorney, Agent, or Firm*—William J. Daniel

[57] ABSTRACT

The methylation of a phenol in an ortho position by the vapor phase reaction of the phenol with methanol using as a catalyst a sintered mixture of ferric oxide, at least one divalent metal oxide of the general formula:

$$MO$$

wherein M is selected from Zn, Mg, Co., Ni, Cr and Cd, and a small amount of manganese oxide calculated in terms of manganese, up to about 1.0% by weight of said ferric and divalent metal oxides, 2,6-dimethyl phenol is a preferred product.

6 Claims, No Drawings

PROCESS FOR THE PREPARATION OF METHYLATED PHENOLS

FIELD OF THE INVENTION

This invention relates to an improved process for the preparation of o-methylphenols, especially 2,6-dimethylphenol and, more particularly, is concerned with a process for selectively methylating at least one ortho position of a phenol using a new metallic oxide catalyst system.

BACKGROUND OF THE INVENTION

Phenolic compounds having a methyl group in their ortho position or positions include, for example, o-cresol and 2,6-dimethylphenol. Among these, o-cresol is widely used as an intermediate for preparing a variety of organic industrial products. On the other hand, 2,6-dimethylphenol has recently been proposed as a starting material for a heat-resistant high molecular weight polymer, e.g., poly-2,6-dimethylphenylene oxide, as well as for antioxidants, fungicidal agents and modified phenol resins.

Processes for preparing alkylphenols known heretofore include the alkylation of a phenol with an olefin or with an alcohol in the presence of an alumina or silica-alumina catalyst. However, these known processes are not suitable for the preparation of 2,6-xylenol because of the large amount of by-products such as anisole, m- or p-cresol, 2,4-xylenol and 2,4,6-trimethylphenol so that the selective conversion into 2,6-xylenol is low. There is also known a process for the preparation of 2,6-xylenol at a good conversion rate, using magnesium oxide as the catalyst (U.S. Pat. No. 3,446,856). However, this process is not satisfactory for industrial scale operation as it is accompanied by the formation of a relatively large amount of 2,4,6-trimethylphenol as a byproduct.

Research on improved processes for selectively methylating the ortho position or positions of a phenol has already led us to propose a process for the preparation of o-methylphenols in a good yield which comprises reacting a phenol at a relatively low temperature with the range from 300°C to 450°C with methanol in the presence of a catalyst system containing various ferrites as disclosed in Japanese Patent Application Nos. 87569/68 and 48824/69. The ferrites used in this process as catalysts are represented by the general formula:

$MFe_2O_4$ wherein M is a divalent metal selected from Zn, Mg, Co, Ni, Cr and Cd.

As a result of further research seeking to further improve this basic process, we have found that addition of a small amount of manganese oxide to said ferrite catalyst serves to increase the yield of o-methylphenols, especially 2,6-dimethylphenol, remarkably and also serves to enhance the rate of recovery of unreacted methanol.

Accordingly, it is the principal object of this invention to provide a process for the preparation of o-methylphenols, especially 2,6-dimethylphenol, in a good yield from a phenol and methanol.

It is another object of this invention to provide a new ferrite catalyst for selectively methylating the ortho position or positions of a phenol.

SUMMARY OF THE INVENTION

In accordance with this invention, these and other objects are attained by reacting a phenol and methanol in the vapor phase in the presence of a complex ferrite catalyst containing manganese oxide in an amount, calculated in terms of manganese, of at most about 1.0% of the total weight of the basic ferrite complex.

DETAILED DESCRIPTION OF THE INVENTION

The basic complex of the catalyst system employed in the process of this invention is composed of a sintered mixture of ferric oxide and at least one metal oxide of the general formula:

$MO$ wherein M is a divalent metal selected from Zn, Mg, Co, Ni, Cr and Cd, to which has been introduced manganese oxide in an amount, calculated in terms of manganese, of not more than about 1.0% based on the total weight of the ferric oxide and the divalent metal oxide. This sintered mixture is predominantly composed of a ferrite complex having a composition represented by the general formula:

$MFe_2O_4$ wherein M has the same meaning as above. In this formula, the manganese oxide added according to this invention is considered to be present in such state that it replaces a part of the MO in the ferrite complex. When either the divalent oxide of $Fe_2O_3$ is used in too large amounts for the preparation of the sintered mixture, the resulting product will be in the form of a mixture of the ferrite complex and the excess oxide.

The catalyst system used in the process of this invention can be prepared, for example, in the following manner.

A water soluble salt of iron, such as ferric sulfate, and a water soluble salt of a given divalent metal, such as zinc sulfate, are weighed individually to satisfy a given molar ratio and then dissolved together in water to form an aqueous solution of both salts. To this solution is added at room temperature the proper proportion of a water soluble salt of manganese. To the mixture is then added under agitation an alkali solution such as ammonia water to coprecipitate the metals as hydroxides. The resulting precipitate is filtered, thoroughly washed with water, dried once at 150°–200°C and pulverized. The precipitate thus obtained is then baked at 450°C for 3 hours to yield the desired catalyst. Alternatively, the catalyst system may be prepared by pulverizing the earlier proposed basic catalyst, mixing the pulverized catalyst with a manganese compound such as an oxide, carbonate, oxalate, hydroxide or the like, milling the mixture in the presence of water and then baking the mixture.

The term "sintering" is employed herein to describe this baking step irrespective of whether or not the material being baked is shaped into some predetermined configuration.

The catalyst system prepared as described above is generally employed directly in the process of this invention. If desired, however, it may be carried on an inorganic porous support such as alumina or silica.

The proportion of a manganese oxide in the catalyst system is, calculated in terms of manganese, not more than about 1.0%, preferably 0.2–0.5%, based on the total weight of ferric oxide and divalent metal oxide.

Any phenol free of substituents in at least one ortho position, i.e., the 2- and/or 6-position, can be used as the starting phenolic material in this process. Such phenols include, for example, phenol itself, m-cresol, p-cresol, o-cresol, 2,3-xylenol, 2,4-xylenol, 2,5-xylenol, 3,4-xylenol, 3,5-xylenol and trimethylphenol.

The methylating agent used in the process of this invention is methanol which need not be necessarily pure and may contain formalin.

An excess of the methanol is advisable. Thus, the amount of the methanol is desirably at least 3 mols, and preferably at least 10 mols, per mol of phenol used. The higher ratios are preferred where the phenol has two ortho positions to be substituted.

The reaction temperature adopted in the process of this invention is within the range of about 300°–450°C, preferably 325°–375°C. If the reaction temperature exceeds 450°C, dehydroxylation or dealkylation reaction will take place to form neutral oils or phenols. On the other hand, if the reaction temperature is lower than 300°C, the rate of reaction will be drastically lowered.

The reaction proceeds satisfactorily under normal pressure without necessity of applying superatmospheric pressure, although higher pressures could undoubtedly be applied if desired.

The process of this invention is advantageously carried out in the presence of water, since the catalyst life is greatly prolonged by adding a small amount of water previously to the reaction system.

In methylating phenols in accordance with this invention, byproducts methylated in their meta and para positions are formed in very minor amounts if at all so that the efficiency of selective ortho methylation is quite high.

Application of the process of this invention to the preparation of 2,6-dimethylphenol permits the preparation of the end product in an extremely high yield as compared to the use of known conventional catalyst systems and, moreover, the technical advantage that the rate of recovery of unreacted methanol is extremely high.

SPECIFIC EXAMPLES OF THE INVENTION

This invention will be explained in more detail by way of the following illustrative examples.

EXAMPLE 1

A reaction mixture comprising 10 molar proportions of methanol and one molar proportion of phenol is introduced at a flow rate of 6.7 g/hour into a preheating layer. To the preheating layer is introduced nitrogen gas at a rate of 44 ml/min. to supply the reaction mixture to a catalyst layer by vapor entrainment. The reaction temperature and the preheating temperature at the preheating layer are kept at 350°C and 270°–290°C, respectively. Employed as catalyst are 6.3 ml of a $ZnFeO_4$-MnO catalyst system prepared by coprecipitation. The results of experiments conducted with catalysts containing varying amount of MnO are shown in the following table.

TABLE 1

| Experiment Numbers | 1 | 2 | 3 | 4 | 5 |
|---|---|---|---|---|---|
| Quantity of Mn (wt %) based on total weight of ferric oxide and zinc oxide | 0 | 0.5 | 1.0 | 5.0 | 20.0 |
| Zn/Fe (atomic ratio) in the catalyst | 1 | 1 | 1 | 1 | 1 |
| Conversion rate of phenol (mol %) | 97.1 | 95.1 | 86.2 | 79.6 | 69.5 |
| Yield of 2,6-dimethylphenol (mol %) | 58.6 | 70.5 | 48.0 | 26.5 | 16.3 |
| Recovery rate of methanol (mol %) | 31.5 | 48.5 | 61.0 | 80.0 | 94.0 |

EXAMPLE 2

The change in activity of the catalyst with duration of use is compared between the manganese-modified catalyst and the manganese-free catalyst. The results of the experiments as shown in Table 2 below in which Exp. No. 1 stands for the case of the manganese-free catalyst, while Exp. No. 2 for the case of the manganese-modified catalyst. The results of this show that by addition of manganese, the induction period appeared early in the reaction, after which the activity was stabilized within a short period of time. The manganese-modified catalyst behaves quite differently from the manganese-free catalyst and exhibits extended catalytic activity.

TABLE 2

| Reaction Time (Hr.) | | 1 | 2 | 3 | 4 | 5 | 6 | 7 |
|---|---|---|---|---|---|---|---|---|
| Exp. No. 1 | Yield of 2,6-dimethylphenol (mol %) | 85.3 | 73.4 | 67.3 | 67.0 | 63.5 | 62.5 | 58.6 |
| Exp. No. 2 | Yield of 2,6-dimethylphenol (mol %) | 85.5 | 99.0 | 90.3 | 75.3 | 72.0 | 70.2 | 70.5 |

EXAMPLE 3

The effect of varying the atomic ration (Zn/Fe) of the ZnO and $Fe_2O_3$ in catalyst systems containing manganese against similar systems free of manganese was examined in a series of experiments and the results are summarized below. The catalysts in each case are prepared by coprecipitation. The reaction conditions are identical with those described in Example 1.

TABLE 3

| Experiment Numbers | 6 | 7 | 1 | 2 | 8 | 9 |
|---|---|---|---|---|---|---|
| Quantity of Mn (wt %) based on total weight of ferric oxide and zinc oxide | 0 | 0.5 | 0 | 0.5 | 0 | 0.5 |
| Zn/Fe (atomic ratio) in the catalyst | 0.5 | 0.5 | 1.0 | 1.0 | 1.5 | 1.5 |
| Yield of 2,6-dimethylphenol (mol %) | 45.0 | 48.2 | 58.6 | 70.5 | 45.5 | 47.0 |
| Recovery rate of methanol (mol %) | 21.5 | 30.2 | 31.5 | 48.5 | 40.5 | 45.0 |

EXAMPLE 4

This example shows the influence of the reaction temperature on the conversion rate of the phenol and the yield of the product. The reaction is conducted under the following reaction conditions:

Methanol (mol)/phenol (mol) = 7.5
Partial pressure of nitrogen: 0.38 atm.
Zn/Fe (atomic ratio) in the catalyst = 1

The catalyst used is prepared by coprecipitation and contained 0.5% by weight of manganese based on the total weight of ferric oxide and zinc oxide. The results of the experiments are tabulated below.

TABLE 4

| Experiment No. | 10 | 11 | 12 | 13 | 14 | 15 |
| --- | --- | --- | --- | --- | --- | --- |
| Reaction temperature (°C) | 300 | 325 | 350 | 375 | 400 | 450 |
| Conversion rate of phenol (mol %) | 12.5 | 28.8 | 76.5 | 82.0 | 86.0 | 47.5 |
| Yield of 2-6-di-methylphenol (mol %) | 1.5 | 5.0 | 31.5 | 38.8 | 40.5 | 13.5 |

In the foregoing examples, the zinc oxide in the catalyst can be replaced with magnesium oxide, cobalt oxide, chromium oxide, nickel oxide or cadmium oxide with generally equivalent results.

What is claimed is:

1. A process for methylating a phenol in an ortho position which comprises reacting a phenol having at least one unsubstituted ortho position and a methanol in the vapor phase in the presence of a catalyst consisting essentially of a sintered mixture of ferric oxide, zinc oxide, and a small amount of manganese oxide up to about 1.0%, calculated in terms of manganese, by weight of said ferric and zinc oxides, said phenol being of the group consisting of phenol; o-, m-, or p-cresol; 2, 3-, 2, 4-, 2, 5-, 3, 4-, or 3, 5-xylenol; or a trimethylphenol having at least one unsubstituted ortho position, said ferric oxide and zinc oxide being present in proportions giving an approximate ratio of ferric iron to zinc on an atomic weight basis of 2:1 to 2:3.

2. A process according to claim 1 wherein the reaction is conducted at about 300°–450°C, preferably at 325°–375°C.

3. A process according to claim 1 wherein said phenol is hydroxybenzene and the product is 2,6-dimethylphenol.

4. The process of claim 1 wherein said methanol and phenol are entrained in a stream of inert gas and passed into contact with said catalyst.

5. The process of claim 1 wherein said methanol and said phenol are present in a molar ratio of at least 3:1.

6. The process of claim 1 wherein said ratio of ferric iron to zinc is about 1:1.

* * * * *